US010595173B2

(12) United States Patent
Shipley et al.

(10) Patent No.: US 10,595,173 B2
(45) Date of Patent: Mar. 17, 2020

(54) SYSTEM AND METHOD FOR VEHICLE PAPERWORK INTEGRATION

(71) Applicant: FORD GLOBAL TECHNOLOGIES, LLC, Dearborn, MI (US)

(72) Inventors: Robert Charles Shipley, Southgate, MI (US); James Evan Baker, Southgate, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 225 days.

(21) Appl. No.: 15/792,200

(22) Filed: Oct. 24, 2017

(65) Prior Publication Data

US 2019/0124477 A1 Apr. 25, 2019

(51) Int. Cl.
| | |
|---|---|
| G06F 21/00 | (2013.01) |
| H04W 4/30 | (2018.01) |
| H04W 4/80 | (2018.01) |
| G06Q 10/00 | (2012.01) |
| H04L 29/06 | (2006.01) |
| G06Q 10/10 | (2012.01) |
| H04W 4/40 | (2018.01) |
| G06Q 50/30 | (2012.01) |
| G07C 5/00 | (2006.01) |
| H04L 29/08 | (2006.01) |
| H04W 12/06 | (2009.01) |
| G06Q 50/18 | (2012.01) |

(52) U.S. Cl.
CPC ............. *H04W 4/30* (2018.02); *G06Q 10/10* (2013.01); *G06Q 10/20* (2013.01); *G06Q 50/30* (2013.01); *G07C 5/008* (2013.01); *H04L 63/0861* (2013.01); *H04L 67/12* (2013.01); *H04L 67/306* (2013.01); *H04W 4/40* (2018.02); *H04W 4/80* (2018.02); *H04W 12/06* (2013.01); *G06Q 50/18* (2013.01)

(58) Field of Classification Search
CPC .......... H04W 4/40; H04W 4/80; H04L 67/12; H04L 67/306; H04L 63/0861
See application file for complete search history.

(56) References Cited

U.S. PATENT DOCUMENTS

| | | | |
|---|---|---|---|
| 2010/0060412 A1* | 3/2010 | Johnson | B60R 25/04 340/5.53 |
| 2014/0279019 A1 | 9/2014 | Cheney et al. | |
| 2015/0194082 A1 | 7/2015 | McEwan | |

(Continued)

OTHER PUBLICATIONS

Petroski, "Iowa Smartphone Driver's License Expected to Launch in 2018," May 21, 2017. Retrieved from http://www.desmoinesregister.com/story/news/politics/2017/05/21/iowa-smartphone-drivers-licenses-expected-launch-2018/332325001/.

*Primary Examiner* — Beemnet W Dada
(74) *Attorney, Agent, or Firm* — Michael Spenner; Brooks Kushman PC

(57) ABSTRACT

A vehicle system comprises a storage configured to store vehicle paperwork data representative of physical vehicle paperwork; an input device configured to receive a command indicative of a user intent to load the paperwork data; an interface configured to verify the user authorization for the paperwork data; an output device configured to electronically output the paperwork data responsive to the command according to the user authorization, wherein the vehicle paperwork data is divided into a plurality of categories accessible by different user authorization.

14 Claims, 5 Drawing Sheets

(56) References Cited

U.S. PATENT DOCUMENTS

2016/0110552 A1\* 4/2016 Tea .................... G06Q 20/3276
                                                                        380/246
2017/0076519 A1 3/2017 Rabbat
2018/0047122 A1\* 2/2018 Sweet .................... G06Q 50/26

\* cited by examiner

SYSTEM AND METHOD FOR VEHICLE PAPERWORK INTEGRATION

TECHNICAL FIELD

The present disclosure is generally related to a vehicle system and method for handling vehicle paperwork, such as driver's license, vehicle registration, and proof of insurance.

BACKGROUND

During traffic stops, the drivers/passengers are usually required to present paperwork such as driver's license and vehicle registrations to police officers. Since many drivers put the paperwork in the glove compartment which may be used to contain weapons/firearms, it may be potentially dangerous for the police officers to allow the drivers to retrieve the paperwork. Sometimes the potential danger may result in hostile and dangerous interactions between police officers and civilians.

SUMMARY

In one or more illustrative embodiments, a vehicle system comprises a storage configured to store vehicle paperwork data representative of physical vehicle paperwork; an input device configured to receive a command indicative of a user intent to load the paperwork data; an interface configured to verify the user authorization for the paperwork data; an output device configured to electronically output the paperwork data responsive to the command according to the user authorization, wherein the vehicle paperwork data is divided into a plurality of categories accessible by different user authorization.

In one or more illustrative embodiments, a method comprises receiving a user input indicative of an intent to load vehicle paperwork data representative of physical vehicle paperwork, the vehicle paperwork data being divided into a plurality of categories of paperwork provided at a traffic stop; verifying the user authorization for the vehicle paperwork data; loading the vehicle paperwork data from a storage responsive to input of user credentials; and outputting the loaded vehicle paperwork data to an output device.

In one or more illustrative embodiments, a system for receiving digital vehicle paperwork comprises a wireless transceiver configured to wirelessly receive vehicle paperwork data representative of physical vehicle paperwork from a vehicle; a processor configured to process the vehicle paperwork data for rendering; and a display configured to render the digital vehicle paperwork using the processed vehicle paperwork data.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle paperwork integration scheme which includes storing and presenting vehicle paperwork electronically. More specifically, the present disclosure proposes systems and methods for allowing vehicle occupants to securely present paperwork stored in vehicle systems to police officers via electronic systems.

Figure 1:
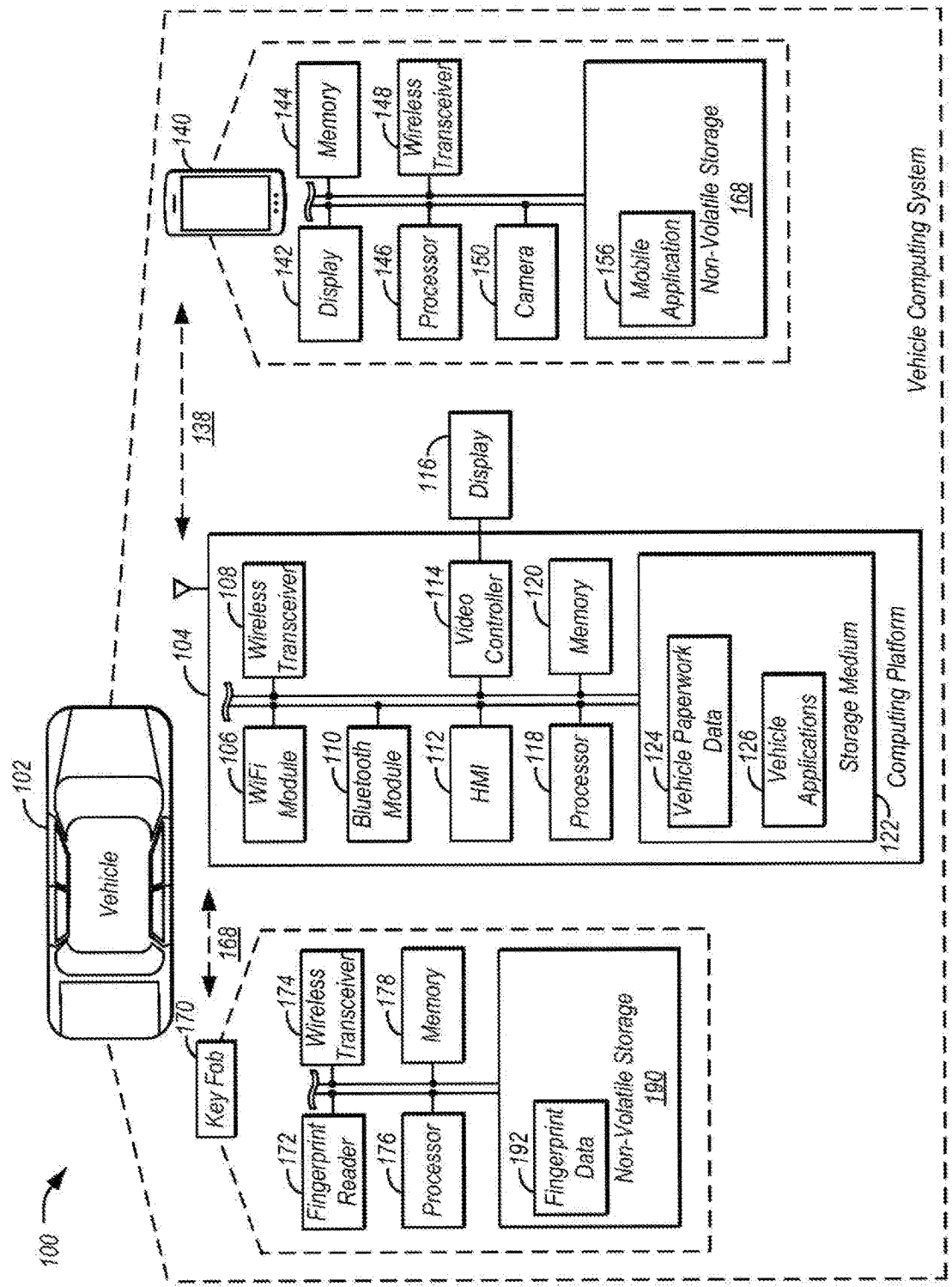
FIG. 1 illustrates an example block topology of a vehicle system of one embodiment of the present disclosure.

FIG. 1 illustrates an example diagram of a system 100 that may be used for vehicle paperwork integration. Vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 118 configured to perform instructions, commands, and other routines in support of the processes described herein. For instance, the computing platform 104 may be configured to execute instructions of vehicle applications 126 to provide features such as navigation, accident reporting, satellite radio decoding, vehicle paperwork integration, and hands-free calling. Such instructions and other data may be maintained in a non-volatile manner using a variety of types of computer-readable storage medium 122. Vehicle paperwork data 124 may be stored in the computer-readable storage medium 122. As an example, vehicle paperwork data 124 may include information about occupant's driver's license, vehicle registration, and/or proof of insurance. The computer-readable medium 122 (also referred to as a processor-readable medium or storage) includes any non-transitory medium (e.g., tangible medium) that participates in providing instructions or other data that may be read by the processor 118 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.). The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities.

Various components of the computing platform 104 may be further configured to communicate with other components of the vehicle 102 via one or more in-vehicle networks 130. The in-vehicle network 130 may include, but is not limited to, one or more of a controller area network (CAN), an Ethernet network, and a media oriented system transport (MOST), as some examples.

The computing platform 104 may be configured to communicate with a mobile device 140 of the vehicle occupants via a wireless connection 138. Alternatively, the mobile device may connect to the computing platform 104 via a wired connection (not shown). The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 108 in communication with a Bluetooth module 110, a Wi-Fi module 106, and other modules such as a Zigbee transceiver, an IrDA transceiver, an RFID transceiver (not shown), configured to communicate with a compatible wireless transceiver 148 of the mobile device 140.

The mobile device 140 may include one or more memories 144 and/or processors 146 configured to perform instructions, commands, and other routines in support of the processes described herein. For instance, the computing platform 104 may be configured to execute instructions of mobile applications 156 to provide features such as vehicle paperwork integration which may include taking pictures using a camera 150 and/or display images using a display 142. The mobile device 140 may be further configured to record vehicle paperwork using the camera 150 and transmit the images of the paperwork to the computing platform 104 via wireless connection 138. Responsive to the transmission from the mobile device 140, the computing platform 104 may be configured to store the vehicle paperwork data 124 in the computer-readable storage medium 122. As an example, the vehicle paperwork data may include the image of an occupant's driver's license, vehicle registration, and proof of insurance. Additionally, the mobile application 156 may include a photo recognition function that allows automatic recognition of the type of paperwork that is being scanned.

The computing platform 104 may be further configured to communicate with a smart key 170 via a wireless link 168. The smart key 170 may be an electronic device having processing and/or communication capability configured to control and/or authorize functions of the vehicle 102. As an example, the wireless link 168 may be based on low-frequency RFID technology. For instance, the smart key 170 may be configured to communicate directly with the computing platform 104. Alternatively, the smart key 170 may be configured to communicate with the computing platform 104 indirectly via other modules, such as via a body control module (not shown) of the vehicle 102. The smart key 170 may be configured to control multiple functions of the vehicle 102 via the wireless link 168. The functions may include door lock/unlock, engine start, etc. The smart key 170 may be equipped with antennas (not shown). During operation, the computing platform 104 may detect the smart key 170 is in the vicinity of the vehicle 102 and, if so, may allow functions of the smart key 170 to be performed.

The smart key 170 may be further configured to record fingerprint data 192 using a fingerprint reader 172 and store the fingerprint data 192 in a storage 190 as an additional security feature. As an example, the storage 190 may be a non-volatile storage medium. For instance, the fingerprint reader 172 may be integrated with the unlock button (not shown) of the smart key 170. During operation, a user/occupant of the vehicle 102 may press the unlock button on the smart key 170 to unlock the car doors. The smart key 170 may be configured to identify the user's identity by comparing the his/her fingerprint recorded using the fingerprint reader 172 with the fingerprint data 192 previously stored in the storage 190, so as to transmit different authorization signals to the computing platform 104 via the wireless link 168. Responsive to the different authorization signals, the computing platform 104 may be configured to activate different functions. As an example, when the recorded fingerprint matches the fingerprint data 192, the smart key determines it is the owner or authorized person that intends to use the vehicle 102, and sends an owner authorization signal to the computing platform 104. Responsive to the owner authorization signal, the computing platform may activate all available functions for the user. On the other hand, when no fingerprint match is detected, the smart key 170 may be configured to send a guest authorization signal to the computing platform 104. Responsive to the guest authorization signal, the computing platform 104 may activate only essential functions such as door unlock and engine start, and keeps sensitive functions inactive. As an example, sensitive functions may be set by the manufacturer and/or the user and may include paperwork integration which includes recording and/or accessing vehicle paperwork data 124.

Figure 2:
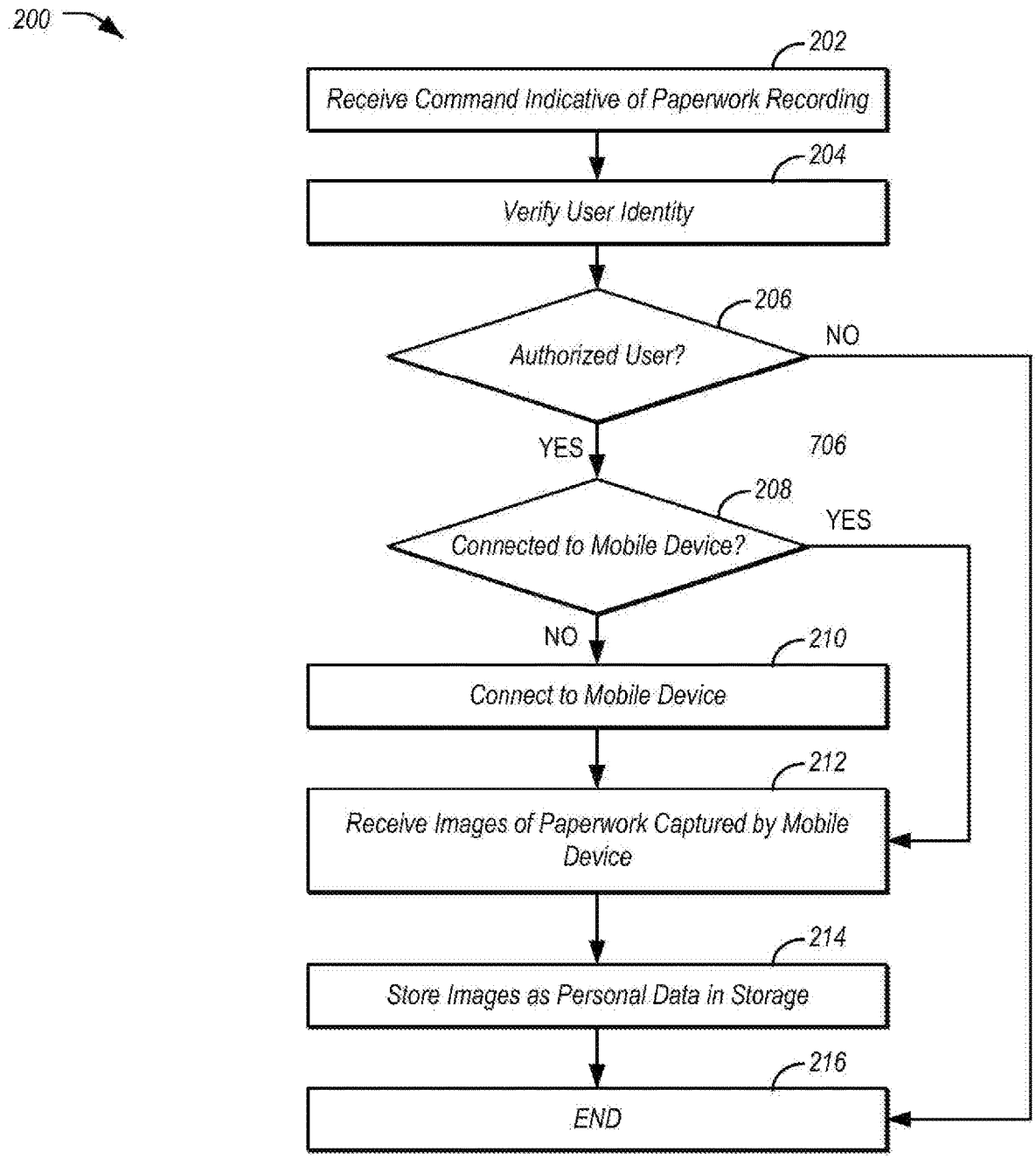
FIG. 2 illustrates an example flow diagram of the process for recording vehicle paperwork data as a part of the paperwork integration scheme of the present disclosure.

FIG. 2 illustrates an example flow diagram of process 200 for recording vehicle paperwork data 124 as a part of the integration scheme. At operation 202, the computing platform 104 initiates the process after receiving a command indicative of a user selecting to record paperwork such as a driver's license. As an example, the command may be triggered by one or more buttons (not shown) or other HMI controls 112 and/or button input in combination with voice commands.

As operation 204, the computing platform 104 verifies the user's identity to determine whether he/she has the authorization to record the personal information. As an example, the verification may be carried out using the fingerprint reader 172 located on the smart key 170. The computing platform 104 may prompt a message via the display 116 inviting the user to put his finger on the fingerprint reader 172 while transmitting a command to the smart key 170 to activate the fingerprint reader 172 via the wireless link 168. Responsive to the command from the computing platform 104, the smart key 170 reads the fingerprint of the user using the fingerprint reader 172 and compares it with the fingerprint data 192 previously stored in the storage 190. If a match is found, the smart key 170 indicates the user is an authorized person, such as the owner of the vehicle 102. The smart key 170 accordingly transmits a verification signal to the computing platform 104 authorizing the paperwork recording and the process continues to operation 208. If no match is found, however, the smart key 170 indicates the user is not an authorized person, such as a valet driver, and the process ends without permitting recordation of the paperwork.

Alternatively, the verification may be carried out by the computing platform 104 itself without connecting to outside devices. As an example, the verification may be carried out by receiving a unique, user-specific password/passcode corresponding to the individual's user profile from the HMI controls 112. As another example, the computing platform 104 may be configured to verify the user's identity using other biometrics, such as face recognition and/or voice recognition technology. For instance, the computing platform 104 may not equipped with an imaging device such as a camera. In such an instance, the computing platform 104 may rely on a camera of a mobile device 140 to capture the images of the paperwork.

At operation 208, the computing platform 104 checks whether a mobile device 140 has already been connected. If the mobile device 140 has already connected to the computing platform 104, the process continues to operation 212. If no mobile device 140 is connected, the process transitions to operation 210 at which the computing platform 104 waits for the presence of the mobile device 140 and connects to the mobile device 140 responsive to the detection. Responsive to connection to the mobile device 104, the process transitions to operation 212.

At operation 212, the computing platform 104 receives images of vehicle paperwork data transmitted from the mobile device 140 captured by the camera 150. As an example, the mobile device 140 may be configured to execute instructions of mobile applications 156 to carry out the predefined capture and transmission functions. Additionally, the mobile applications 156 may further include an image recognition function that allows the mobile device 140 to automatically recognize what type of paperwork it is capturing. For instance, when the user is capturing his/her driver's license, the mobile applications 156 may automatically recognize the type/category of paperwork and tag the image as a driver's license. When the registration is being captured, the mobile applications 156 may automatically tag the image as a registration. As an example, the mobile application 156 may be configured to recognize the type/category of paperwork using at least one of the following methods: optical character recognition (OCR) with predefined keywords search; matching patterns (e.g. size, color, aspect ratio) of the paperwork with predefined pattern; and/or scanning the paperwork in a predefined sequence. If the mobile applications 156 cannot recognize the type of the paperwork, it may tag the paperwork as of unknown type and/or prompt the user to enter the type of the paperwork.

In another example, an alternative document submission approach may allow a user to submit a portable document format (PDF) or other digital file format from digital scans of a hard documents (e.g., vehicle registration and/or proof of insurance documents). The digital file format document may be stored to the mobile device 140 in an example. As yet a further possibility, the user may enter a drivers license number and/or other information manually in the event no hard documentation is available or in a faulty data transfer is encountered.

At operation 214, the computing platform 104 stores the images received from the mobile device 140 to the computer-readable medium 122. Since the paperwork may involve sensitive information, the vehicle paperwork data 124 may be encrypted by the computing platform 104 before being stored. The process ends at operation 216.

Figure 3:
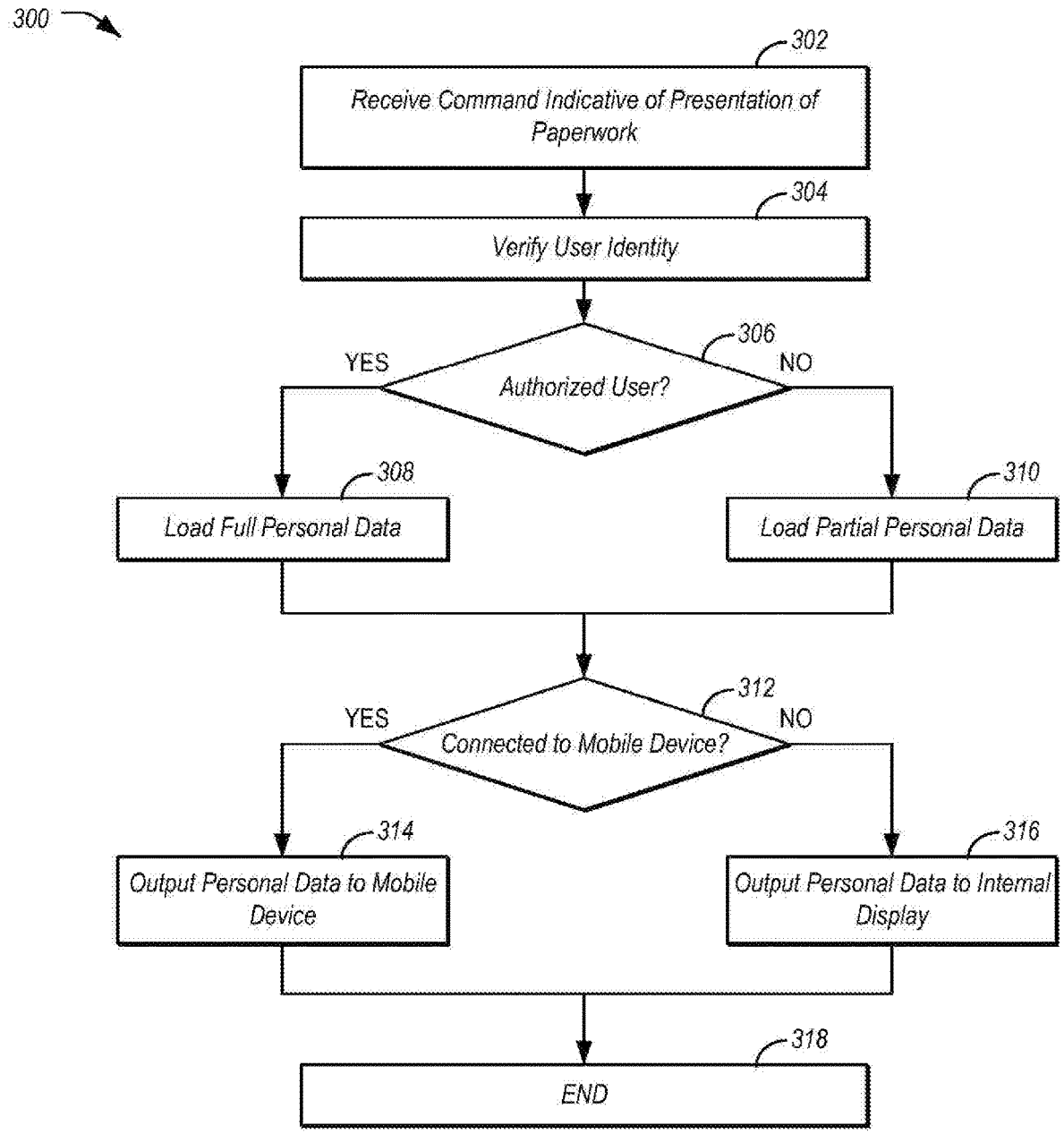
FIG. 3 illustrates an example flow diagram of the process for loading vehicle paperwork data as a part of the paperwork integration scheme of the present disclosure.

FIG. 3 illustrates an example flow diagram of process 300 for loading vehicle paperwork data 124 as a part of the integration scheme. At operation 302, the computing platform 104 initiates the process 300 responsive to receiving a command indicative of a user request to load and present paperwork such as a driver's license. As an example, the command may be triggered by one or more buttons (not shown) or other HMI controls 112 combined with voice commands. Additionally, the command may be triggered by a request from a police officer in a police vehicle through a wireless connection during a traffic stop and confirmation of such request by the user of the vehicle 102.

As operation 304, the computing platform 104 verifies the user's identity to determine whether he/she is authorized to access the paperwork. As an example, the verification may be carried out using the fingerprint reader 172 located on the smart key 170. The computing platform 104 may provide a message via the display 116 inviting the user to put his/her finger on the fingerprint reader 172 while transmitting a command to the smart key 170 to activate the fingerprint reader 172 via the wireless link 168. Responsive to the command from the computing platform 104, the smart key 170 reads the fingerprint of the user using the fingerprint reader 172 and compares it with the fingerprint data 192 previously stored in the storage 190.

At operation 306, if a match is found, the result indicates the user is an authorized person, such as the owner of the vehicle 102. The smart key 170 transmits a verification signal to the computing platform 104 and the control passes to operation 308. At operation 308, the computing platform 104 loads the full vehicle paperwork data 124 from the computer-readable storage medium 122 and the process 300 continues to operation 312.

If at operation 306, no match is found, the smart key 170 sends a signal to the computing platform 104 indicating that the user is not authorized. An unauthorized user may be, as some possibilities, a valet driver or a friend borrowing the car from the owner. If the user is not authorized, control passes to operation 310.

At operation 310, the computing platform 104 may load only a part of the vehicle paperwork data such as the image of vehicle registration and proof of insurance, and deny access to sensitive data such as the owner's driver's license. This is useful when a person who is driving the vehicle with the owner's permission is stopped by a police officer. The driver only needs to access paperwork, such as vehicle registration and proof of insurance stored in the computer-readable storage medium 122 and presents his own driver's license. Alternatively, the computing platform 104 may be configured to deny access to any paperwork data for unauthorized users.

At operation 312, the computing platform 104 checks whether a mobile device 140 is connected. If the mobile device 140 is connected to the computing platform 104, the process passes to operation 314; otherwise, the process passes to operation 316.

At operation 314, the computing platform 104 outputs the vehicle paperwork data 124 to the mobile device 140 for display. If the vehicle paperwork data 124 is encrypted, the computing platform 104 may decrypt the data and then transmit the decrypted data to the mobile device 140. Displaying the paperwork on the display 142 of the mobile device 140 is preferred because of its flexibility. During a traffic stop, many police officers prefer to take the paperwork back to the police vehicle for investigation. Operation 314 allows the occupant/driver to hand the paperwork to the police officer by way of the mobile device 140. Alternatively, the computing platform 104 may be configured to provide the vehicle paperwork data 124 to a mobile device of the police officer. The paperwork data 124 may be sent to the police officer's mobile device via a wireless link when he/she is at the vicinity of the vehicle 102. This way, the user of the vehicle 102 does not need to hand his personal mobile device 140 to the police officer, avoiding the exposure of private/personal information to the police officer.

At operation 316, responsive to a determination that the mobile device 140 is not available, the computing platform 104 may alternatively display the paperwork on an internal display such as the display 116 via the video controller 114. Or, the computing platform 104 may display the paperwork to an external display screen of the vehicle 102, such as a display embedded in the "B" pillar. The process 300 ends at operation 318.

Figure 4:
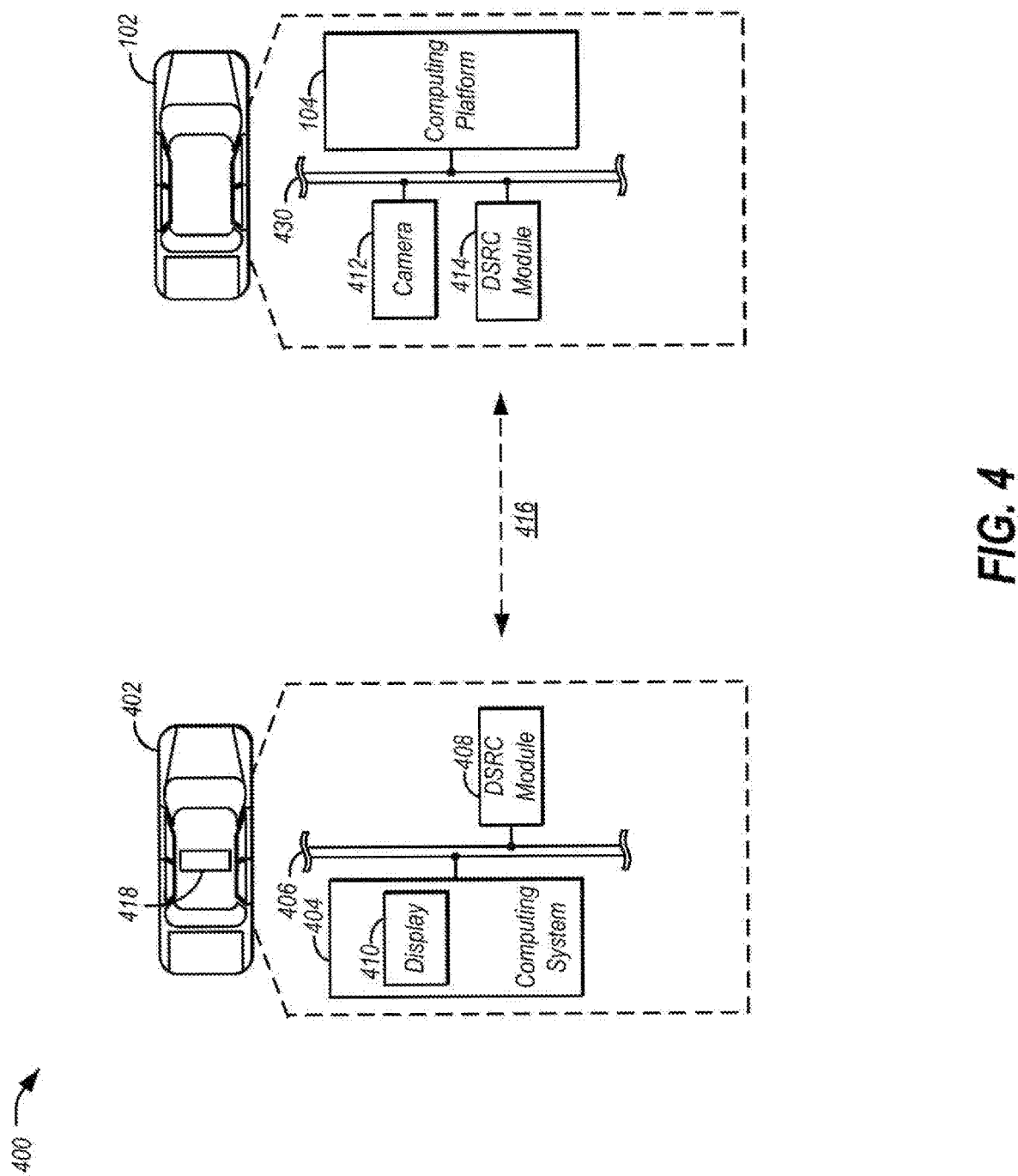
FIG. 4 illustrates an example block topology of the vehicle system of another embodiment of the present disclosure.

FIG. 4 illustrates another example diagram of a system 400 that may be used for vehicle paperwork integration. Similar to the embodiment illustrated in FIG. 1, a vehicle 102 includes a computing platform 104. The computing platform 104 may be configured to communicate with other components of the vehicle 102 via an in-vehicle network 430. The in-vehicle network 430 may include, but is not limited to, one or more of a controller area network (CAN), an Ethernet network, and a media oriented system transport (MOST), as some examples. The in-vehicle network 430 may allow the computing platform 104 to communicate with other vehicle systems, such as a camera 412 and a DSRC (dedicated short range communications) module 414. As an example, the camera 412 is configured to detect any emergency vehicle 402 (also known as police vehicle or law enforcement vehicle) at the vicinity of vehicle 102.

The emergency vehicle 402 has a computing system 404 configured to communicate with other components via an in-vehicle network 406. As an example, the computing system 404 communicates with a DSRC module 408 via the in-vehicle network 406. The DSRC module 408 of the emergency vehicle is configured to communicate with other DSRC modules of vehicle 102 via antennas and wireless transceivers (not shown) during traffic stops. As an example, when a police officer operating the emergency vehicle 402 turns on emergency lights 418 of his or her vehicle 402, and instructs the vehicle 102 to stop, the DSRC module 408 of the emergency vehicle 402 is configured to transmit a traffic stop signal to other DSRC modules nearby, particularly to the vehicle 102 in front of the emergency vehicle 402, instructing it to stop.

Responsive to the traffic stop signal, the DSRC module 408 of the emergency vehicle 402 may be configured to instruct the vehicle 102 to pull over and stop. As an example, the computing platform 104 generates notifications to instruct the driver to stop the vehicle 102 responsive to a signal from the DSRC module 414. Alternatively, for autonomous vehicles, the vehicle 102 may be configured to automatically pull over and stop at a safe location. As another example, the camera 412 may detect the emergency lights 418 emitted from the emergency vehicle 402 and instruct the vehicle 102 to pull over and stop.

The DSRC module 414 of the vehicle 102 may be further configured to establish a wireless link 416 with the DSRC module 408 of the emergency vehicle 402. The wireless link 416 may be used to communicate instructions and transmit data. The computing platform 104 may be configured to execute instructions of vehicle applications 126 to allow the vehicle 102 to load and transmit the vehicle paperwork data 124 to the emergency vehicle 402 directly via the wireless link 416. Responsive to the reception of the vehicle paperwork data 124, the computing system 404 may be configured to display the image of the paperwork using outputs such as a display 410. In this way, the occupant of the vehicle 102 may provide paperwork to the police officer electronically without physically handing over the documents.

Figure 5:
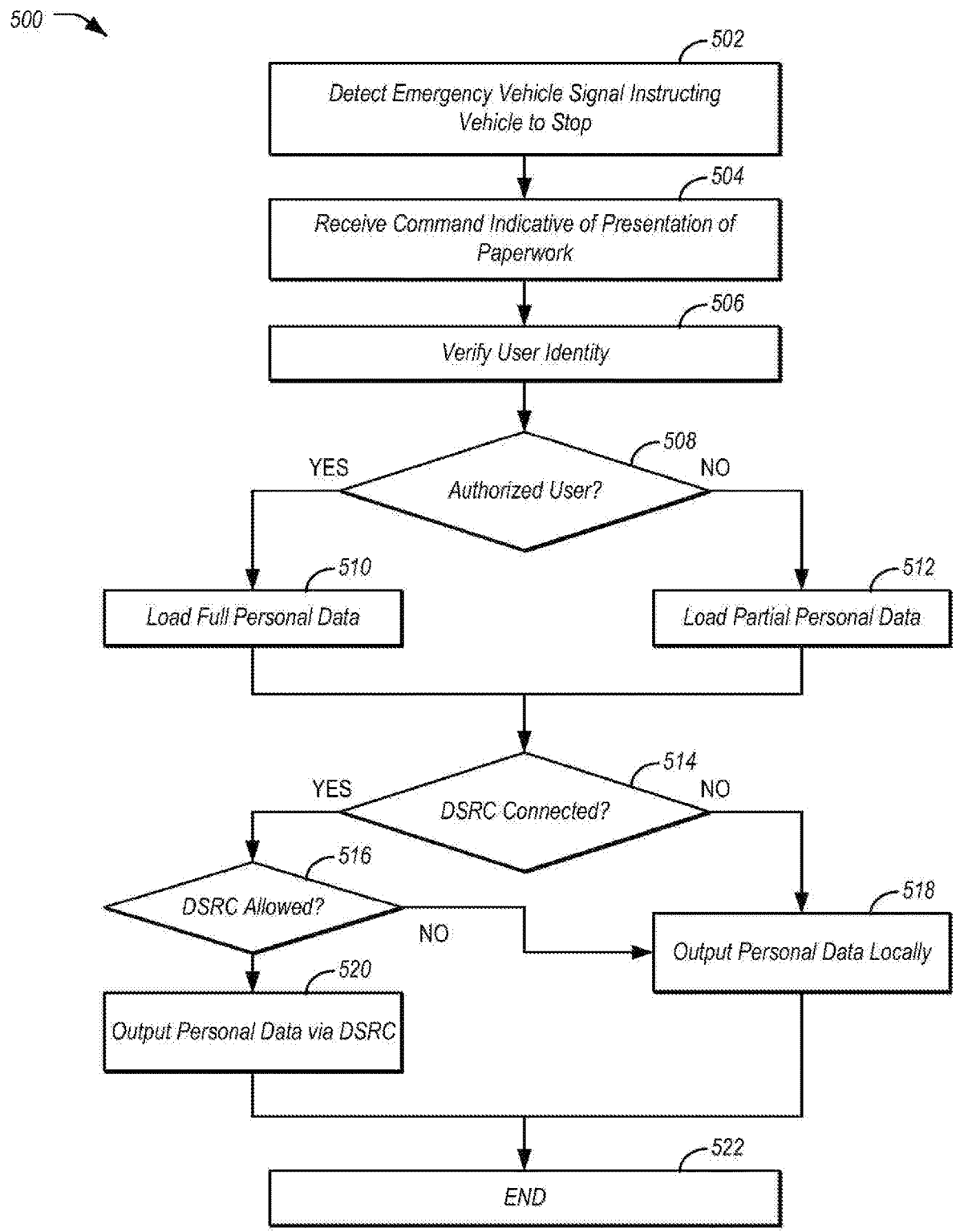
FIG. 5 illustrates another example flow diagram of the process for loading and transmitting vehicle paperwork data as a part of the paperwork integration scheme of the present disclosure.

FIG. 5 illustrates an example flow diagram of process 500 for loading and transmitting vehicle paperwork data 124 as a part of the integration scheme according to another embodiment of the present disclosure. At operation 502, the computing platform 104 of the vehicle 102 receives a traffic stop signal via the in-vehicle network 430 instructing the vehicle to pull over and stop. As discussed previously, the traffic stop signal may be sent from the DSRC module 414 responsive to instructions received from the DSRC module 408 of the emergency vehicle 404. Alternatively, the traffic stop signal may be received from the camera 412 responsive to the detection of emergency lights 410 emitted from the emergency vehicle 402.

At operation 504, the computing platform 104 receives a command indicative of a user specifying to load and present paperwork to the emergency vehicle 402. As an example, the command may be triggered by one or more buttons (not shown) or other HMI controls 112 combined with voice commands. Alternatively, the emergency vehicle 402 may send a request for paperwork via the DSRC link 416 and the user may confirm or decline the request.

As operation 506, similar to operation 304 illustrated in FIG. 3, the computing platform 104 verifies the user's identity to determine whether he/she has authorization to access the personal information. As an example, the verification may be carried out using the fingerprint reader 172 located on the smart key 170. At operation 508, if a match is found, the process continues to operation 510. At operation 510, similar to operation 308 illustrated in FIG. 3, the computing platform 104 loads the full vehicle paperwork data 124 from the computer-readable storage medium 122 and the process continues to operation 514. If at operation 508, no match is found, the process continues to 512. At operation 512, similar to operation 310 illustrated in FIG. 3, the computing platform 104 may load only a portion of the vehicle paperwork data such as the image of vehicle registration and proof of insurance, and deny access to sensitive data such as the owner's driver's license.

At operation 514, the computing platform 104 checks whether the DSRC link 416 has been established between the vehicle 102 and the emergency vehicle 402. If the DSRC link 416 has not and cannot be established, the process continues to operation 518 where the computing platform 104 outputs the vehicle paperwork data locally via the display 116 or the mobile device 140. If at operation 514 it is determined that the DSRC link 416 is connected, the process passes to operation 516. At operation 516, the computing platform 104 transmits the vehicle paperwork data 124 from the DSRC module 414 to the DSRC module 408 of the emergency vehicle 402 via the DSRC link 416. Responsive to a successful transmission, the computing system 404 of the emergency vehicle 402 may display the image of the paperwork requested using the display 410. The process ends at operation 522.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system of a vehicle, comprising:
    a storage onboard the vehicle configured to store vehicle paperwork data representative of physical vehicle paperwork;
    an input device configured to receive a command indicative of a user intent to load the paperwork data, the paperwork data include driver's license data associated with a user, and vehicle registration data of the vehicle;
    an interface configured to receive a user biometric input to verify against an identity of the user;
    a processor programmed to
        responsive to verifying the user biometric input matches the identity of the user, permit access to both the driver's license data and the vehicle registration data, and
        responsive to verifying the user biometric input fails to match the identity of the user, permit access to the vehicle registration data and decline access to the driver's license data.

2. The system of claim 1, wherein the interface is further configured to receive the biometric input from a keyfob associated with the vehicle, the keyfob having a biometric reader configured to collect the biometric input.

3. The system of claim 2, wherein the biometric reader includes a fingerprint reader.

4. The system of claim 1, wherein the interface is located on a vehicle key in communication with the vehicle system.

5. The system of claim 1, wherein the output device is configured to output the vehicle paperwork data, to which access is permitted responsive to the verifying of the user biometric input, to a mobile device wirelessly connected to the system for display.

6. The system of claim 5, further comprises a camera configured to detect presence of an emergency vehicle by capturing image data indicative of emergency light being emitted from the emergency vehicle.

7. The system of claim 6, wherein the output device is configured to, responsive to the detection of the emergency vehicle, wirelessly output the paperwork data permitted access to the emergency vehicle.

8. The system of claim 7, wherein the output device is configured to output the vehicle paperwork data permitted access to the emergency vehicle using DSRC (dedicated short range communications) transmission.

9. A method for a vehicle, comprising:
receiving a user input indicative of an intent to load vehicle paperwork data representative of physical vehicle paperwork, the vehicle paperwork data include driver's license data associated with a user, and vehicle registration data of the vehicle;
receive a user fingerprint input via a keyfob wirelessly connected to the vehicle;
verify the user fingerprint input to identify a current user of the vehicle;
responsive to verifying the current user is authorized, permitting access to both the driver's license data and the vehicle registration data;
responsive to verifying the current user is unauthorized, permitting access to the vehicle registration data and declining access to the driver's license data; and
transmitting the paperwork data permitted access to an emergency vehicle via a wireless transceiver.

10. The method of claim 9, further comprising:
outputting the paperwork data permitted access to via an external display embedded in a "B" pillar of the vehicle.

11. The method of claim 9, further comprising:
connecting to a mobile device with imaging capability;
verifying a user's authorization for the recording of vehicle paperwork; and
when the user is authorized,
receiving image data representative of data recorded by the mobile device; and
storing the image data as vehicle paperwork data to a storage.

12. The method of claim 11, further comprising encrypting the image data received from the mobile device to generate the vehicle paperwork data for storage.

13. The method of claim 11, further comprising categorizing the vehicle paperwork data before storing.

14. The system of claim 1, further comprising:
an external display embedded in a "B" pillar of the vehicle,
wherein the processor is further programmed to output the paperwork data permitted access via the external display.

* * * * *